(12) United States Patent
Yüksel (10) Patent No.: US 12,464,345 B2
(45) Date of Patent: Nov. 4, 2025

(54) METHOD AND SYSTEM FOR VERIFYING DATA COMMUNICATION INTEGRITY IN AN AIRCRAFT

(71) Applicant: Volocopter GmbH, Bruchsal (DE)

(72) Inventor: Burak Yüksel, Tübingen (DE)

(73) Assignee: Volocopter GmbH, Bruchsal (DE)

( * ) Notice: Subject to any disclaimer, the term of this patent is extended or adjusted under 35 U.S.C. 154(b) by 302 days.

(21) Appl. No.: 18/228,939

(22) Filed: Aug. 1, 2023

(65) Prior Publication Data

US 2024/0048973 A1 Feb. 8, 2024

(30) Foreign Application Priority Data

Aug. 5, 2022 (EP) ..................................... 22188921

(51) Int. Cl.
*H04W 12/037* (2021.01)
*B64D 45/00* (2006.01)
*H04L 9/32* (2006.01)

(52) U.S. Cl.
CPC .......... *H04W 12/037* (2021.01); *B64D 45/00* (2013.01); *H04L 9/3239* (2013.01); *B64D 2045/0085* (2013.01)

(58) Field of Classification Search
CPC . H04L 9/3239; H04L 9/40; H04L 9/50; H04L 63/123; H04L 67/12; H04W 12/037; B64D 2045/0085; B64D 45/00
See application file for complete search history.

(56) References Cited

U.S. PATENT DOCUMENTS

| | | | |
|---|---|---|---|
| 11,082,409 B2* | 8/2021 | Silberman | H04L 63/08 |
| 2006/0230238 A1* | 10/2006 | Roy | H04L 45/122 |
| | | | 711/141 |
| 2019/0222494 A1* | 7/2019 | Sundaram | H04L 69/22 |
| 2019/0265690 A1* | 8/2019 | Mattingly | G08G 5/59 |
| 2019/0281026 A1* | 9/2019 | Mitchell | H04W 12/04 |
| 2019/0334697 A1* | 10/2019 | Winslow | H04L 9/3242 |
| 2020/0184739 A1* | 6/2020 | Nathan | G06Q 10/20 |
| 2021/0144073 A1 | 5/2021 | Gupta et al. | |
| 2021/0264526 A1* | 8/2021 | Bryant | H04L 9/0643 |
| 2022/0189317 A1* | 6/2022 | Winslow | H04W 12/63 |
| 2022/0215471 A1* | 7/2022 | Simpson | G06F 3/0346 |
| 2022/0286845 A1* | 9/2022 | Vanoss | H04W 4/80 |

FOREIGN PATENT DOCUMENTS

| | | |
|---|---|---|
| CN | 105472619 | 11/2018 |
| CN | 110191027 | 8/2019 |

\* cited by examiner

*Primary Examiner* — Eric W Shepperd
(74) *Attorney, Agent, or Firm* — FIG. 1 Patents (57) ABSTRACT

Method of verifying data communication integrity in an aircraft which has first and second data generating and sending entities. Data generated at the first entity is sent to the second entity as messages via a number of intermediate entities. The data communication is a blockchain with blocks, each being added to the blockchain by one of the entities and including a cryptographic hash representative of the prior block, thus linking the blocks. The method includes: a) logging a message subgroup and cryptographic hash at one or more of the first, second and intermediate entities; b) collecting message logs from each entity for verification; c) comparing messages sent by the first entity and messages received by the second entity; and d) if not all messages have arrived at said second entity, comparing message logs of intermediate entity(ies) with the message log of the first entity to identify where loss occurred.

17 Claims, 4 Drawing Sheets

METHOD AND SYSTEM FOR VERIFYING DATA COMMUNICATION INTEGRITY IN AN AIRCRAFT

CROSS-REFERENCE TO RELATED APPLICATIONS

This application claims priority to European Patent Application No. 22188921.5, filed Aug. 5, 2022, which is incorporated herein by reference as if fully set forth.

TECHNICAL FIELD

The invention relates to a method of verifying data communication integrity in an aircraft, said aircraft comprising at least a first data generating and sending entity and at least a second data receiving entity, wherein data generated at said first entity is sent from said first entity to said second entity in the form of messages via a number of intermediate entities.

The invention also relates to a system for verifying data communication integrity in an aircraft, said system comprising at least a first data generating and sending entity, e.g., a pilot input device, and at least a second data receiving entity, e.g., an actuator, wherein said first entity and said second entity are operatively connected for sending data generated at said first entity from said first entity to said second entity in the form messages via a number of intermediate entities.

Another aspect of the invention is an aircraft, in particular an electrically propelled VTOL (vertical take-off and landing) aircraft operated by means of said method and/or comprising said system.

BACKGROUND

In modern avionics, a large number of entities, e.g., flight controllers, actuators, data distributors, etc. cooperate in order to control flight of an aircraft, in particular a UAV (unmanned aerial vehicle). Between said entities, a large number of communications occur at high frequencies.

Consider an FBW (Fly-By-Wire) system on an aircraft. Pilot or autonomy input generates certain commands (fly upwards, do left turn, etc.), and these commands travel as messages through the whole avionics until they become suitable commands for the actuators of the aircraft (e.g., rotors, turbines or control surfaces like ailerons or elevators).

The "data" or "message" thus generated by a human or autonomous pilot travels through many complex components or entities of the aircraft, which entities consist of hardware (HW) and software (SW) items.

With such high frequency communications, dropping of individual messages every now and then may occur and may not be considered as a big problem, at least not at first glance. However, if there is a trend in the way that messages are getting lost (e.g., one message out of a certain number of messages and/or with some regularity, or if messages always get lost between certain components or entities), an aircraft operator may never know about this until said trend becomes a major or catastrophic event.

In classical aviation message handling implementations, to the best knowledge of the applicant, one does not detect the loss of messages. To remedy this situation, one sends messages fast enough and accepts to lose some of them every once in a while.

There is a need for a method and system of the above-mentioned type that help to overcome the problem of unknowingly losing messages between entities in an aircraft communication chain, thus avoiding major or catastrophic events, preferably by means of predictive maintenance.

SUMMARY

This object is achieved by a method having and by a system, each having one or more of the features disclosed herein.

Advantageous further embodiments are defined below and in the claims.

According to the present invention, there is proposed a method of verifying data communication integrity in an aircraft, said aircraft comprising at least a first data generating and sending entity and at least a second data receiving entity, wherein data generated at said first entity is sent from said first entity to said second entity in the form of messages via a number of intermediate entities, wherein said data communication is devised in the form of a blockchain that comprises a number of blocks, each one of said blocks being added to the blockchain by a respective one of said entities and—with the possible exception of the initial or starting block—including a cryptographic hash representative of the prior block in the blockchain, thus linking said two blocks, the method comprising:

a) logging, i.e., storing or recording at least a subgroup of the messages, preferably at least each message with predefined important information, most preferably all of the messages, together with a cryptographic hash at at least some of said first, second and intermediate entities, preferably at all of said first, second and intermediate entities;

b) collecting message logs from each entity to be verified, preferably at least from said first entity and said second entity, most preferably from all of said first, second and intermediate entities;

c) comparing at least the messages (from said message logs) generated and sent by said first entity and the messages received by said second entity;

d) in case that not all of the messages generated and sent by said first entity have arrived at said second entity, comparing the message logs of each intermediate entity with the message log of said first entity in order to identify an intermediate entity in which message loss occurred.

In the present description, "message loss" and "message corruption" are treated as equivalent.

"Important information" refers to any information that has an impact on the stability, controllability or manoeuvrability of the aircraft and safe completion of its mission.

An illustrative example would be a pitch command from a pilot. For instance, the pilot can command pitch by moving a control stick. The motion of the stick is detected and measured via, e.g., encoders on the stick. These measurements are processed, e.g., by a small computer located on the control stick, which is an example for said first entity, in message format with corresponding hashes, and this particular message is tagged as important.

The present invention presents a way of verifying if all of these messages have arrived at said second entity, which may be an actuator (via passing by through components, e.g., flight control computers, distributors, etc., that represent intermediate entities).

In a preferred embodiment, every entity that sends or relays a message will append the hash of said message at least with some source information, and preferably also with a unique hash part. In this way, a path of the message through a communication network comprising said entities can be verified.

In another preferred embodiment, each "important" message is stamped with a hash that is uniquely generated for that message. In order to improve traceability of the messages, one can add further identifiers into the hash. For example, an element "c0" can identify a pilot input and an element "3m" can identify roll/pitch/yaw/altitude commands packed together, thus creating a combination of message source and message content. Since the hash changes with every intermediate entity or message and since there is a new message in every time frame (wherein a window size of the time frame might change depending on the source, i.e., its computation power), a total size of the hash would need to be bigger than just four digits (as in the above example) to make each one of them unique (or as unique as possible considering the probabilities).

Further according to the present invention, there is proposed a system for verifying data communication integrity in an aircraft, said system comprising at least a first data generating and sending entity, e.g., a pilot input device, and at least a second data receiving entity, e.g., an actuator, wherein said first entity and said second entity are operatively connected for sending data generated at said first entity from said first entity to said second entity in the form of messages via a number of intermediate entities, wherein said data communication is devised in the form of a blockchain that comprises a number of blocks, each one of said blocks—preferably with the exception of the initial or starting block—including a cryptographic hash representative of the prior block in the blockchain, thus linking said two blocks, said system being adapted to, preferably by providing the required hardware and/or software:
  a) log, i.e., store or record at least a subgroup of the messages, preferably at least each message with predefined important information, most preferably all of the messages, together with a cryptographic hash at at least some of said first, second and intermediate entities, preferably at all of said first, second and intermediate entities;
  b) collect message logs from each entity to be verified, preferably at least from said first entity and said second entity, most preferably from all of said first, second and intermediate entities;
  c) compare at least the messages generated and sent by said first entity and the messages received by said second entity;
  d) in case that not all of the messages generated and sent by said first entity have arrived at said second entity, compare the message logs of each intermediate entity with the message log of said first entity in order to identify an intermediate entity in which message loss occurred.

In this way, the proposed idea allows exact knowledge of a message (which can be any message, but for the sake of simplicity one may consider only very important messages, the respective importance of which can be predetermined based on some heuristic criterion), which message has been exchanged between different components or entities of an aircraft and which message has dropped. In the present context, messages comprising a command from pilot, a pitch command from pilot, a yaw command from pilot or an altitude (climb/descent) command from pilot are examples of (very) important messages.

The idea enables the aircraft operator to find out how often said message got lost in the whole chain (e.g., from pilot input down to actuator commands), and where exactly it got lost. Knowing this allows to detect if a degradation on an aviation component occurs over time, and take necessary action, for example, perform maintenance and replace a defected aviation component. This further enables detection of a trend that could lead to a major or catastrophic event. In this way, the method according to the invention can advantageously be used for predictive maintenance. Alternatively or additionally, the method can be used for online self-assessment of the aircraft as well.

The present invention makes use of the concept of blockchains, which have become widely known due to their role in cryptocurrencies. However, blockchains are not limited to such uses. In general, according to general knowledge, a blockchain is a growing list of records, called blocks, that are linked together using cryptography. Each block contains at least a cryptographic hash of the previous block, preferably a timestamp, and some transaction (or—in the present case—flight control) data (which may be represented as a Merkle tree). The timestamp may prove that the transaction data existed when the block was published to get into its hash. As each block contains information about the blocks previous to it, they form a chain, with each additional block reinforcing the ones before it. Therefore, blockchains are resistant to modification of their data because once recorded, the data in any given block cannot be altered retroactively without altering all subsequent blocks.

From the perspective of a blockchain, one can perceive the above-mentioned aircraft components (e.g., pilot input devices, flight control computers, actuator controllers, actuators, data distributors, etc.) as nodes. As stated above, an information, which may be a very important one, that is generated in one node might get lost in another. For example, it may be questionable whether or not everything that a human pilot commanded via a corresponding input device (e.g., a control stick) has ended up in the actuators. Although it might not be required for a safe and controllable flight that every single message arrives accordingly, not knowing the answer to this question might shadow dormant failures in one or multiple nodes within the system (i.e., said avionics components). Dormant failures are sleeping failures, which means that they are present, but they are not accounted for, which may have catastrophic results.

The proposed method and system allow to detect the loss of potentially important information/messages in an aircraft communication chain, preferably an aircraft using an FBW system, hence revealing a degradation of aviation components over time. This in return can be advantageously used for predictive maintenance. Moreover, as already mentioned, the same method can be used for online and inflight self-assessment as well.

As stated above, according to the invention blockchain technology is employed for "meaningful message loss" detection.

In case of an online detection (preferably on-board the aircraft during flight), one can use a centralized computer to do the monitoring. Each (meaningful) message is assigned a hash for the blockchain from its own node or entity (e.g., pilot input device, flight controller, or other components in the loop), which also embeds the history of previous nodes. In this way, said centralized computer knows about the origin of said message and the entire course of the communication until said message arrives at said centralized computer.

Said centralized computer may advantageously read from all components or entities and preferably also has knowledge about the underlying system architecture. For instance, said centralized computer may know that a given message should first go from pilot input device to flight controller, and then to the actuators; it does not expect messages from actuators inside, e.g., the pilot control stick, but the other way around (i.e., pilot commands eventually go to the actuators). This can be implemented, e.g., by using routing tables, look-up tables, if/elseif or switch/case methods, without limitation. In this way, the centralized computer can detect if that message does follow the prescribed chain of communication or not. Since the centralized computer knows the correct communication sequence, it will also know where it broke, if it does break. In this way, one can detect loss of (important) messages and an exact location of such loss, if a given message arrived at one entity, as expected, but not at a next entity in said communication sequence.

In post-flight use of the method according to the present invention, i.e., in the offline case, one can easily perform predictive maintenance by comparing the hashes generated and logged by every node.

In a corresponding embodiment of the present invention steps b) to d) are performed at the end of a given flight mission of the aircraft.

In another embodiment of the present invention steps b) to d) are performed by a ground-based computer system.

Offline usage of the present invention may include post-flight processing for (predictive) maintenance. In order to achieve this, at the end of each flight mission, logs from each node (or entity) of interest may be collected, preferably by means of an external data processing device. For example, said entities may comprise a pilot input device (head of communication) and an actuator controller (tail of communication). Preferably, at least each message with important information (according to some criterion) is logged (i.e., recorded with a corresponding hash at a respective entity) according to the blockchain concept. Then, one can compare, e.g., by means of said external data processing device, the messages generated by pilot input and the messages received by actuator controller. This allows to validate whether or not all messages generated from pilot input have arrived at the actuator controller.

A preferred way of implementing this feature is to look at the hashes, which advantageously contain information of the message and the node (or entity) where it was generated. Due to the block chaining, this information is carried along the way by appending the hash while the message goes through different nodes (entities). At the end of the communication sequence, the hash preferably looks longer and bigger than the original one (as generated by said first entity).

Should this not be the case, there is a possible issue in one of the nodes (entities) involved in the communication. For further analysis in order to understand which node (entity) is problematic, one can compare the message logs of each node or entity with the message logs of the head, as explained above.

In an embodiment of the present invention, one can use this feature for analysing and understanding the nature of message drops or corruptions, e.g., whether or not it is repetitive, whether or not it does happen always on the same node. It is the purpose of the method presented here to provide means to ask such questions, which questions may then be answered based on collected data, e.g., data collected via/during component or aircraft testing and operations.

As stated before, a potential use of this method includes predictive maintenance and dormant failure detection.

Online usage of the present invention may include aircraft health monitoring during flight. In a corresponding embodiment of the invention, steps b) to d) are performed on-board during flight of the aircraft.

Preferably, this is done by means of another computer or data processing device (e.g., a central communication computer or an aircraft health monitoring computer). In a corresponding embodiment of the invention, steps b) to d) are performed by a central communication computer system or aircraft health monitoring computer system on-board the aircraft.

Preferably, said computer receives all the messages (or at least any important messages) from the nodes that are of interest. In a corresponding embodiment of the invention, said on-board computer system receives said messages from at least the entities to be verified.

Since online (in-flight) computation can be prone to false positives and increased WCET (worst case execution time), embodiments of the present invention aim to prevent these issues. For instance, one can allow or tolerate a specific predetermined amount of message drops. In a corresponding embodiment, steps c) and d) are performed so as to allow a specific amount of message losses.

Advantageously, this can be controlled by defining a counter that has a hysteresis. In an embodiment, said counter may increase by, for example, ten (10) increments when a message is found to be dropped or corrupted, and it may decrease by a single increment when a message has been relayed correctly. In a corresponding embodiment, said amount is controlled with a counter that has a hysteresis, said counter increasing by a first number, N, of increments when a message is lost or otherwise corrupted, and decreasing by a second number, n, if no message loss or corruption occurs, wherein preferably $N>n$, most preferably $N=10$ and $n=1$.

Preferably, said counter has a predefined threshold for detection and alert, i.e., said counter has a predefined threshold for detection of message loss, and an alert is generated if said counter reaches said predefined threshold value.

In yet another embodiment, if said counter is above said threshold, a detected event of message loss is logged (recorded), and an alert message is generated, for alerting any one of crew or control station or autopilot. This may preferably comprise initiating a safe landing procedure.

To further save computational time and resources, it is preferred not to carry out a comparison of the data from all nodes for every time step, but to implement a strategy of comparing different nodes in subsequent time frames (so-called sequencing).

In this context, in another embodiment at least step d) is performed sequentially over a number of time frames, each one of said time frames comprising the comparison of message logs of a respective subgroup of said (intermediate) entities, said subgroup preferably also comprising said first entity and/or said second entity. Said subgroup advantageously comprises different entities for every time frame, in order to be able to monitor all of them.

In the method presented here, we use the blockchain technology for message loss detection. Conventionally, in such technologies a proof-of-work (PoW) concept is used, which consumes a huge amount of computation time. PoW is a form of cryptographic proof in which one party (the prover) proves to others (the verifiers) that a certain amount of a specific computational effort has been expended. A key feature of proof-of-work schemes is their asymmetry: the work—the computation—must be moderately hard (yet feasible) on the prover or requester side, but easy to check for the verifier or service provider. PoW was popularized by Bitcoin as a foundation for consensus in a permissionless decentralized network, in which miners compete to append blocks to a chain and mint new currency, each miner experiencing a success probability proportional to the computational effort expended.

In contrast to this, in an embodiment of the method according to the invention, we do not use said concept, which is not required, since the system is not distributed. We solely make use of the unique labelling part of blockchain technology (hashes) and extend it for offline and online maintenance and health monitoring of aircraft in a fast and efficient way. In other words: In a corresponding embodiment, the method does not require any proof-of-work for validating or adding new blocks in/to said blockchain.

BRIEF DESCRIPTION OF THE DRAWINGS

Additional features and advantages of the invention will now be described in exemplary fashion with reference to the drawings.

DETAILED DESCRIPTION

Figure 1:
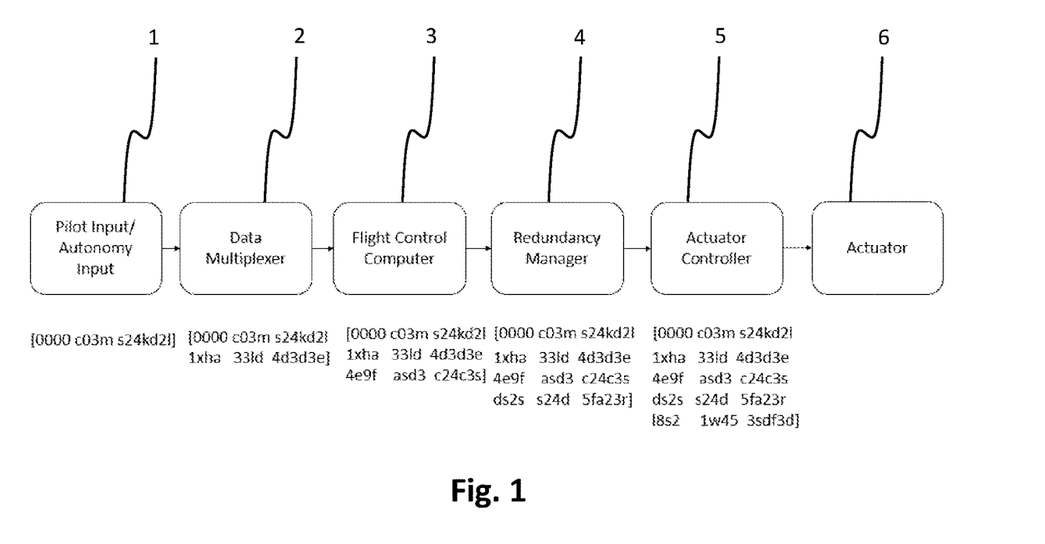
FIG. 1 shows a simple example of a communication chain in an aircraft.

FIG. 1 shows a simple communication chain (single point-to-point) in an aircraft comprising different entities, e.g., from left to right, a pilot or autonomous input device 1, a (first) data distributor 2, a flight control computer 3, a redundancy manager 4, an actuator controller 5 and an actuator 6, which actuator 6 is controlled via said actuator controller 5 by means of input data generated by said input device 1 and relayed (and/or modified, e.g., by said flight control computer 3) by said other intermediate entities 2-4.

Said pilot or autonomous input device 1 can be regarded as a first data generating and sending entity, and said actuator controller 5 or said actuator 6 itself can be seen as a second data receiving entity. However, in some way all the intermediate entities 2 through 4 function as data generating and sending entities, while at the same time also functioning as data receiving entities. This will become apparent in the following description.

As shown in FIG. 1, said first entity (e.g., input device 1) and said second entity (e.g., actuator controller 5 or the actuator 6) are operatively connected for sending data generated at said first entity from said first entity to said second entity in the form of messages via a number of intermediate entities, cf. reference numerals 2-4.

In the Figures, said messages are symbolised by means of alphanumerical characters below each of the entities 1 through 5.

Figure 2:
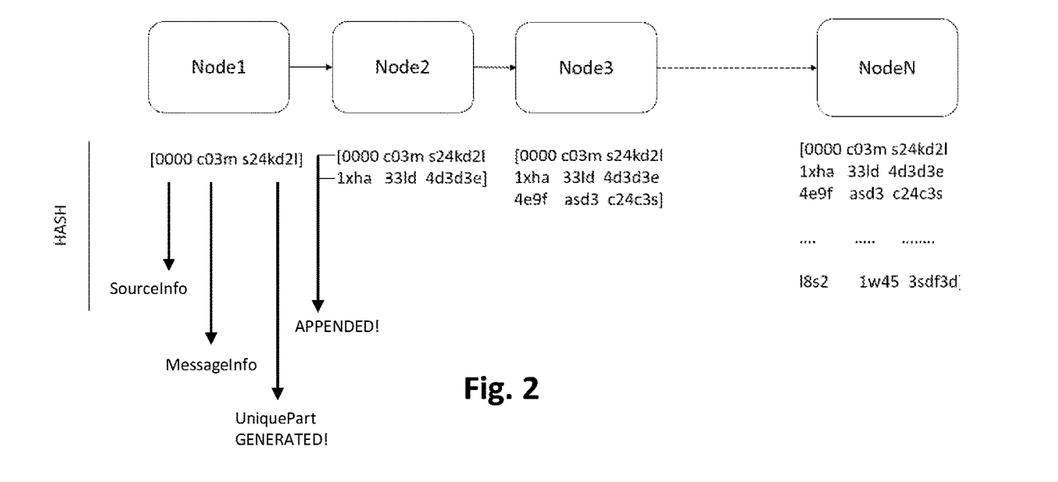
FIG. 2 shows a generic blockchain.

As shown in FIG. 2, from a more generic point of view, said entities 1 through 6 can be regarded as nodes, which are denoted Node1 through NodeN, $N \in \mathbb{N}$.

Messages carrying important information, e.g., said control input data, are relayed from entity to entity, i.e., from node to node, as indicated by arrows in FIG. 1 and FIG. 2. A message carrying an important information might, for example, stem from pilot input and can consist of, for example, a roll command.

The first block of the corresponding message chain (i.e., a blockchain) is generated by said input device 1 (i.e., Node1). This is also referred to as "head". Furthermore, said first message block is assigned a corresponding source information (named "SourceInfo"), i.e., "0000" (cf. FIGS. 1 and 2; without limitation), stating that nothing before was attached to that node, which can be considered the "origin" node. Next, there is a part denoted "MessageInfo", e.g., "c03m", as explained before, followed by a so-called "UniquePart", e.g., "s24kd2l" that is generated at the node. While "SourceInfo" and "MessageInfo" are assigned (headers) and thus known a priori, the "UniquePart" is generated in the respective source; it is not known before. These three parts together are referred to as hash, cf. FIG. 2.

Each node (or entity 2-5) adds (appends) a block to the message chain they receive from the previous node or entity and thus updates/appends the cryptographic hash, wherein each block again comprises information as to message source and content as well as said unique part. Each node updates/appends the hash when passing on said message to the following node. In this way, every block comprises information about the previous block (and therefore all other previous blocks), thus forming a chain that cannot subsequently be altered without changing every block in the chain.

For example, Node2 appends hash [0000 c03m s24kd2l] received from Node1 with [1xha 33ld 4d3d3e] so that the new hash reads as: [0000 c03m s24kd2l 1xha 33ld 4d3d3e], and so forth.

As stated before, a hash generated in any one node comprises the following parts: Hash=[SourceInfo MessageInfo UniquePart], e.g., [0000 c03m s24kd2l].

Each hash is appended by the current node before it is forwarded to the next node. For example, with j>i, hash_i= [0000 c03m s24kd2l]; hash_j=[1xha 33ld 4d3d3e].

The corresponding message goes from node_i to node_j and then is sent on from node_j. Downstream of node_j, the message would read: hash_j(out)=[0000 c03m s24kd2l 1xha 33ld 4d3d3e], cf. FIG. 2 with i=1 and j=2.

Note that the next hash_j (for j=3) includes "c03m" and "asd3", which encode different message information. This could be equivalent to, e.g., "c03m"=pilot pitch command and "asd3"=demanded pitch torques computed in flight control computer (also referred to as "FCC").

Consider an embodiment wherein hash_i (cf. above) was coming from a pilot input device (cf. element 1 in FIG. 1) and hash_j (cf. above) was coming from FCC (cf. element 3 in FIG. 1), these entities being directly connected to each other without another node in between (or without a hash generating node in between, cf. data multiplexer 2 in FIG. 1).

Then one knows from hash_j(out) that said pilot pitch command is related to the demanded pitch torques from FCC, and one knows their source, too.

There could also be a case wherein the message info part of the message does not change, meaning the message is being forwarded to the next node without being used for anything else in the current node other than to combine the hashes of two nodes before forwarding to the next node.

Standard hash generating algorithms, like SHA (secure hash algorithm), can be used to generate the hashes. SHA is a standard method that may suffer from its relatively large block sizes. For the present purpose, Message Digest Algorithm 5 (also referred to as "MD5") can be sufficient. Other alternatives could be custom methods with even smaller block sizes or SHA-1. Eventually, preferred methods should be cheaper (in terms of required resources) than standard SHA algorithms, which can include random number/character generators of 3, 4, 5, . . . , 12 digits (without limitation), depending on available memory and interface limitations (e.g., baudrate).

As stated before, in the present example "c03m" is the part of the hash (header 1) that is assigned for the messages containing pilot pitch command information and "asd3" here is the part of the hash (header 1) that is assigned for the demanded pitch torque information.

Furthermore, there are uniquely generated parts of the whole hash. These unique parts are generated anew every time when a message is sent. This can be used to verify if every message really goes through the chain and until it reaches the end.

In a way, the unique part is like a time stamp, without needing an actual time stamp. If there were no unique part, and if, e.g., say Node3 (cf. FIG. 2) was skipping messages from time to time, one would never know that said messages were skipped because all messages would look the same.

As shown, the hashes are appended along the way. The longer the hash gets, the further a message has travelled. The maximum size of the hash is defined by the architecture, i.e., the number of nodes or entities.

In this way, each node or entity 1 through 5 adds a hash to the message they receive from the previous one. Furthermore, each node or entity 1 through 5 updates the hash with a new message (said "MessageInfo"). This creates a transparent and traceable history from head (at entity 1) to end (at entity 5 or 6), for example in the illustrated single point-to-point case from pilot command (input device 1) to the actuator actions (by means of entity 6).

As shown in FIG. 1, at the end of the chain there is the actuator controller 5 (or another HW with SW) that makes use of a message with important information for commanding the actuator(s) 6.

Figure 3:
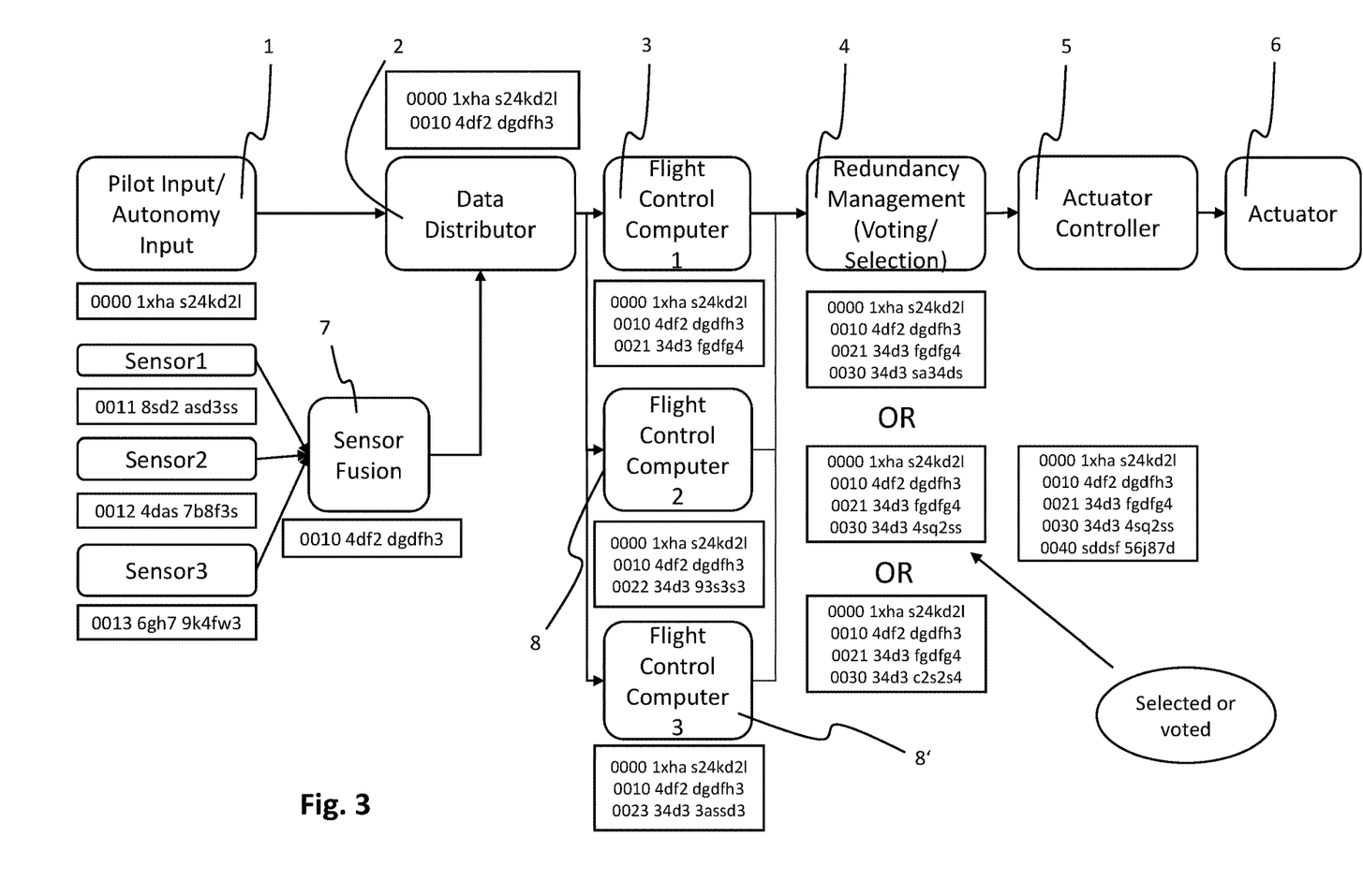
FIG. 3 shows a more complicated communication chain in an aircraft.

FIG. 3 shows a more complicated but still similar example of another communication chain in the form of a redundant or multi-drop case. Again, the head is generated by pilot or autonomous input (input device 1). Additional data stems from sensors denoted "Sensor1" through "Sensor 3", which sensor data (which all have different source info data, are fused at entity 7 ("Sensor Fusion"). Data distributor 2 simply relays the data from entities 1 and 7 without adding another block (or information) and updating the hash(es). Note that this is different from element 2 in FIG. 1, which actually added some information. In FIG. 3, the message is then passed on to flight controller 3, which is arranged in parallel with additional flight controllers 8 and 8'. All three flight controllers (FCC) add data (i.e., a block) to the chain and update the hash. The same happens at redundancy management entity 4, which in the present case selects the output of FCC1 (reference numeral 3), and at actuator controller 5 before the message finally arrives at actuator 6.

In each of the cases illustrated in exemplary fashion is FIGS. 1 and 3, the individual messages at every entity are logged (i.e., recorded on a suitable storage medium, which is not shown in the Figures) with the corresponding hash. For instance, at the end of each flight mission, one can collect said logs from each node or entity of interest, e.g., pilot input device 1 (head) and actuator controller 5 (end), by means of a data processing device, e.g., a computer (not shown). One can then compare, with said data processing device, the messages generated and sent by input device 1 and the messages received by actuator controller 5.

In the nominal case, all generated and sent messages from input device 1 have arrived at actuator controller 5. If not, there is a possible issue in one of the nodes/entities 1 through 5 or any other node therebetween. For further analysis on understanding which node or entity is problematic, one can then compare, with said data processing device, the logs of each node/entity with the logs of the head (input device 1) in order to find out at which node the message flow became interrupted or corrupted.

This analysis can be used for understanding the nature of the message drops or corruptions: For instance, is it repetitive? Does it happen always on the same node? Why or in which message context does it occur? Preferably, these questions are then answered by means of collected data via component or aircraft testing and operations.

Figure 4:
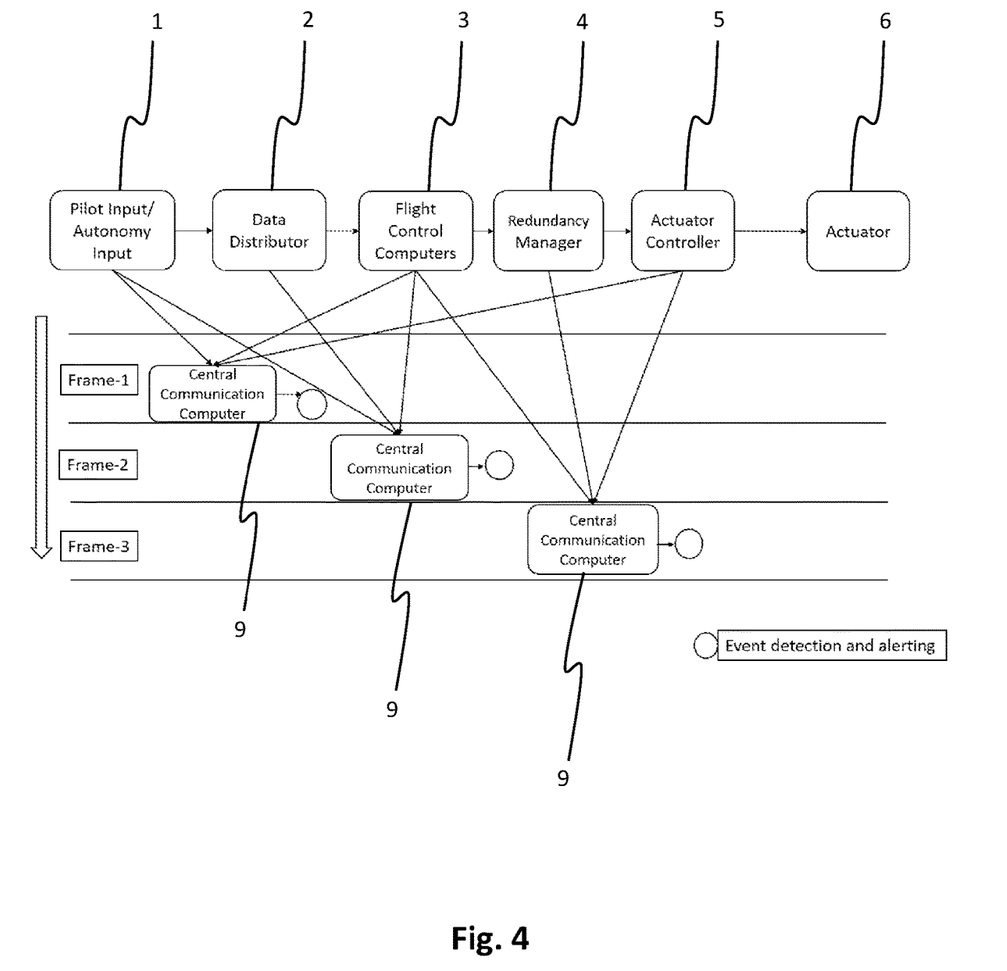
FIG. 4 shows online usage of a blockchain for aircraft health monitoring using a centralized computer.

As illustrated in FIG. 4, a similar procedure can be used in a so-called online case, where the analysis is done in flight and by another data processing device on board the aircraft, e.g., a computer (which can be a central communication computer on board the aircraft—as shown in exemplary fashion at reference numeral 9 in FIG. 4) or an aircraft health monitoring computer). Said computer 9 shall preferably receive all the (important) messages from the nodes/entities that are of interest.

As already explained above, online computation can be prone to false positives and increased WCET (worst case execution time). To avoid this, embodiments of the invention tolerate a specific amount of message drops. This can be controlled with a counter that has a hysteresis, as already explained in detail.

As further illustrated in FIG. 4, one preferably does not compare the data from all nodes or entities at once but can advantageously implement a strategy of comparing different nodes or entities in subsequent time frames (sequencing). For instance, during "Frame-1", data from input device 1, flight controller 3 and actuator controller 5 are compared by computer 9. In subsequent "Frame-2", one compares data from input device 1, data distributor 2 and flight controller 3 by means of computer 9. Then, in "Frame-3", a comparison is made by computer 9 between data from flight controller 3, redundancy manager 4 and actuator controller 5. In every frame, computer 9 performs event detection and alerting, if necessary (cf. FIG. 4). This may happen if said counter is above a threshold. In this case, the event is logged, and crew (or control station or autopilot) is/are alerted. If necessary, a safe landing procedure can be (automatically) initiated.

Figure 5:
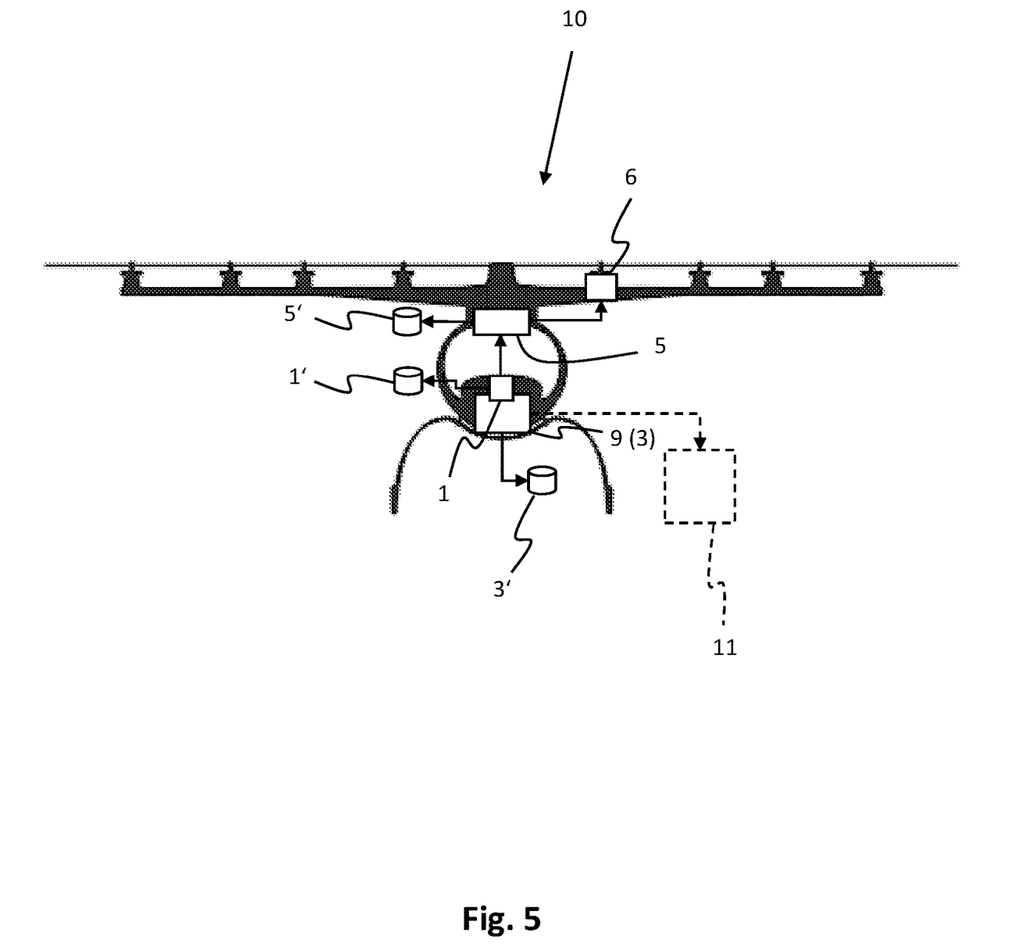
FIG. 5 shows an aircraft comprising a system in accordance with the present invention.

FIG. 5 illustrates the use of the invention for operating an aircraft, e.g., an electrically propelled VTOL aircraft in the form of a multicopter 10. Aircraft 10 comprises multiple actuators in the form of electrically powered rotors, only one of them being denoted by reference numeral 6 (cf. FIGS. 1 and 3). Reference numeral 1 indicates a pilot input device, as before. Reference numeral 5 indicates an actuator controller. The other entities depicted in FIGS. 1 and 3 are omitted for reason of clarity.

Reference numeral 9 indicates said computer that has been previously mentioned in connection with the embodiment of FIG. 4. In the shown embodiment, said computer 9 is also used as flight controller 3, although additional hardware may be advantageously used for this latter purpose. Reference numeral 11 indicates an optional additional ground-based data processing device (e.g., a computer) that can be used in the above-described offline (after flight) analysis case.

As explained in detail above, during flight of aircraft 10, entities 1, 3 and log respective messages that are generated and/or relayed together with said corresponding hashes, e.g., at respective storage means 1', 3', 5' or centrally (not shown). Communication integrity can then be analysed in flight (by means of computer 9, which can access storage means 1', 3', 5' or which directly receives all messages) and/or after mission completion (by means of computer 11, which can access storage means 1', 3', 5').

It should be noted that in the method presented here we use blockchain technology for message loss detection without relying on such technologies as a proof-of-work (PoW) concept, which consumes a lot of computation time. In the present method, no PoW is required, because the system is not a distributed system. We make use only of the unique labelling part of blockchain technology and extend it for offline and online maintenance and health monitoring of aircraft in a fast and efficient way.

The invention claimed is:

1. A method of verifying data communication integrity in an aircraft, said aircraft comprising at least a first data generating and sending entity and at least a second data receiving entity, data generated at said first entity is sent from said first entity to said second entity as messages via a number of intermediate entities, said data communication is devised as a blockchain that comprises a number of blocks, each one of said blocks being added to the blockchain by a respective one of said entities and including a cryptographic hash representative of a prior one of the blocks in the blockchain, thus linking said two blocks, the method comprising:
   a) logging at least a subgroup of the messages together with a cryptographic hash at at least some of said first, second and intermediate entities;
   b) collecting message logs from each said entity to be verified;
   c) comparing at least the messages generated and sent by said first entity and the messages received by said second entity; and
   d) in case that not all of the messages generated and sent by said first entity have arrived at said second entity, comparing the message logs of each said intermediate entity with the message log of said first entity in order to identify a one of the intermediate entities in which message loss occurred.

2. The method of claim 1, further comprising performing steps b) to d) at an end of a given flight mission of the aircraft.

3. The method of claim 1, further comprising performing steps b) to d) by a ground-based computer system.

4. The method of claim 1, further comprising performing steps b) to d) on-board during flight of the aircraft.

5. The method of claim 1, further comprising performing steps b) to d) by a central communication computer system or aircraft health monitoring computer system on-board the aircraft.

6. The method of claim 5, wherein said on-board computer system receives said messages from at least the entities to be verified.

7. The method of claim 1, further comprising performing steps c) and d) so as to allow a specific amount of message losses.

8. The method of claim 7, further comprising controlling said amount with a counter that has a hysteresis, said counter increasing by a first number, N, of increments when one of the messages is lost or otherwise corrupted, and decreasing by a second number, n, when no message loss or corruption occurs.

9. The method of claim 8, wherein N>n.

10. The method of claim 8, wherein said counter has a predefined threshold for detection of message loss and the method further comprises generating an alert when said counter reaches a predefined threshold value.

11. The method of claim 10, further comprising, when said counter is above said threshold, logging a detected event of message loss, and generating an alert for alerting any one of crew or control station or autopilot.

12. The method of claim 1, further comprising performing at least step d) sequentially over a number of time frames, each one of said time frames comprising a comparison of the message logs of a respective subgroup of said entities.

13. The method of claim 12, wherein said subgroup also includes at least one of said first entity or said second entity.

14. The method of claim 12, wherein said subgroup comprises different ones of the entities for every one of the time frames.

15. The method of claim 1, wherein the method is used for predictive maintenance and dormant failure detection.

16. The method of claim 1, wherein the method does not require any proof-of-work for validating or adding new blocks into said blockchain.

17. A system for verifying data communication integrity in an aircraft, said system comprising a processing device and a non-transitory computer readable storage medium to store instructions that, when executed by the processing device, perform operations that configure the system to implement:
   at least a first data generating and sending entity;
   at least a second data receiving entity;
   said first entity and said second entity are operatively connected for sending data generated at said first entity from said first entity to said second entity as messages via a number of intermediate entities, wherein said data communication comprises a blockchain that includes a number of blocks, each one of said blocks including a cryptographic hash representative of a prior one of the blocks in the blockchain, thus linking said two blocks, said system being configured to:
   a) log at least a subgroup of the messages together with a cryptographic hash at at least some of said first, second and intermediate entities;
   b) collect message logs from each said entity to be verified;
   c) compare at least the messages generated and sent by said first entity and the messages received by said second entity; and
   d) in case that not all of the messages generated and sent by said first entity have arrived at said second entity, compare the message logs of each said intermediate entity with the message log of said first entity in order to identify one of the intermediate entities in which message loss occurred.

* * * * *